(12) United States Patent
Kress (10) Patent No.: US 10,076,793 B2
(45) Date of Patent: Sep. 18, 2018

(54) DRILLING TOOL AND METHOD FOR PRODUCING DRILL HOLES

(71) Applicant: MAPAL FABRIK FUR PRAZISIONSWERKZEUGE DR. KRESS KG, Aalen (DE)

(72) Inventor: Dieter Kress, Aalen (DE)

(73) Assignee: MAPAL FABRIK FUR PRAZISIONSWERKZEUGE DR. KRESS KG, Aalen (DE)

( * ) Notice: Subject to any disclaimer, the term of this patent is extended or adjusted under 35 U.S.C. 154(b) by 0 days.

(21) Appl. No.: 15/397,024

(22) Filed: Jan. 3, 2017

(65) Prior Publication Data
US 2017/0113283 A1 Apr. 27, 2017

Related U.S. Application Data

(63) Continuation of application No. 13/982,046, filed on Jul. 26, 2013, now abandoned.

(51) Int. Cl.
  *B23B 51/02* (2006.01)
  *B23B 51/00* (2006.01)
  *B23B 51/06* (2006.01)

(52) U.S. Cl.
  CPC ............ *B23B 51/02* (2013.01); *B23B 51/009* (2013.01); *B23B 51/06* (2013.01); *B23B 2215/04* (2013.01);
  (Continued)

(58) Field of Classification Search
  CPC ............. Y10T 408/356; Y10T 408/348; Y10T 408/353; Y10T 408/81; Y10T 408/78; Y10T 408/9097; Y10T 408/905; Y10T 408/906; B23B 51/02; B23B 51/08; B23B 2226/31; B23B 2226/315; B23B 2228/10;
  (Continued)

(56) References Cited

U.S. PATENT DOCUMENTS

| | | | | | |
|---|---|---|---|---|---|
| 805,170 | A | * | 11/1905 | Thomas | B23Q 11/10 408/224 |
| 1,747,117 | A | * | 2/1930 | Klein | B23B 51/009 408/223 |
| 2,389,909 | A | * | 11/1945 | Hofbauer | B23B 51/0081 408/223 |
| 4,091,525 | A | * | 5/1978 | Karasiewicz | B23D 77/02 29/90.01 |

(Continued)

FOREIGN PATENT DOCUMENTS

JP 57021214 A * 2/1982

*Primary Examiner* — Daniel Howell
*Assistant Examiner* — Yasir Diab
(74) *Attorney, Agent, or Firm* — Stephen T. Olsen; Harness, Dickey & Pierce, P.L.C.

(57) ABSTRACT

A drilling tool for producing drill holes includes a tip and a shaft arranged opposite the tip in a direction of a longitudinal axis of the drilling tool. The drilling tool has at least one geometrically defined cutting edge in the tip area, and has an expanded diameter trailing the tip in a longitudinal direction from the tip. The drilling tool has a first area with a first diameter that precedes the expanded diameter, and a second area with a second diameter, larger than the first diameter, that trails the expanded diameter. The drilling tool is distinguished in that the expanded diameter and/or the second area is/are embodied such that chips are produced in the area of the expanded diameter and/or in the second area when a workpiece is machined, chips consistent with those produced when a workpiece is machined with a geometrically undefined cutting edge.

15 Claims, 4 Drawing Sheets

(52) U.S. Cl.
CPC ... *B23B 2226/275* (2013.01); *B23B 2251/408* (2013.01); *B23B 2251/443* (2013.01); *Y10T 408/78* (2015.01); *Y10T 408/81* (2015.01); *Y10T 408/905* (2015.01); *Y10T 408/906* (2015.01); *Y10T 408/9097* (2015.01)

(58) Field of Classification Search
CPC .......... B23B 2251/244; B23B 2226/27; B23B 2226/275; B23B 51/009; B23B 2251/443; B23B 2215/04
See application file for complete search history.

(56) References Cited

U.S. PATENT DOCUMENTS

| | | | | |
|---|---|---|---|---|
| 4,834,655 | A * | 5/1989 | Kyotani | A61C 3/02 433/166 |
| 5,000,630 | A * | 3/1991 | Riley | B23B 51/00 407/1 |
| 5,020,394 | A * | 6/1991 | Nakamura | B23B 51/00 407/118 |
| 5,197,233 | A * | 3/1993 | Wiand | B24B 13/01 407/32 |
| 5,226,760 | A * | 7/1993 | Nishimura | B22F 7/06 407/118 |
| 5,326,196 | A * | 7/1994 | Noll | B23B 31/005 408/225 |
| 6,783,449 | B2 * | 8/2004 | Inoue | B24B 29/005 408/27 |
| 2010/0254779 | A1 * | 10/2010 | Wedner | B23B 51/009 408/224 |

* cited by examiner

DRILLING TOOL AND METHOD FOR PRODUCING DRILL HOLES

CROSS-REFERENCE TO RELATED APPLICATIONS

This application is a continuation of U.S. application Ser. No. 13/982,046 filed 26 Jul. 2013, which is a 371 U.S. National Stage of International Application No. PCT/EP2012/000425 filed 1 Feb. 2012, which claims priority to German Patent Applications No. DE 10 2011 016 960.1 filed 13 Apr. 2011 and DE 10 2011 010 821.1 filed 2 Feb. 2011, the disclosures of which applications are incorporated herein by reference.

FIELD

The invention relates to a drilling tool and to a method for producing drill holes.

BACKGROUND

Drilling tools and methods for producing drill holes, especially in composite materials, are known. Composite materials comprise at least two layers of different materials. At least one layer preferably comprises fiber-reinforced plastic, especially carbon fiber-reinforced plastic. At least one second layer preferably comprises metal, especially aluminum or titanium. Such composite materials are especially employed when high loads are to be transferred with the least possible weight. This may be for instance connection points between structural components or other highly stressed points, for instance in aircraft design. Consequently, composite materials are primarily, but not exclusively, used in the aircraft industry. It has been demonstrated that, due to the different specific machining properties and other physical parameters for the various material layers in the composite materials, also known as stacks, it is extremely difficult to produce drill holes whose the diameter is sufficiently precisely defined in the individual layers. In particular, the different elasticities of the individual materials lead to a drill hole that runs through different layers but does not have the same diameter in the individual layers. This can mean that especially a drill hole with very narrow tolerances may fall outside of tolerances in at least one layer. Even if the drill hole is initially pre-bored to a smaller dimension and then it is finish reamed to the final dimensions in a known manner, there may be a deviation in the diameter in the individual material layers, which is problematic, especially for drill holes with very narrow tolerances. In addition, it is a disadvantage in such a method that there are two work steps. During reaming there is the additional problem that typical reaming tools have only small chip spaces, while composite materials frequently include tough layers, and long chips are produced when the materials are machined. This is the case with aluminum, for instance. Especially if the diameter of the drill hole that is to be reamed is small, long chips may clog the chip spaces of the reaming tool and/or damage the surface of the drill hole. This problem also occurs with drill reamers, that is, combined drilling and reaming tools. In general the chip spaces in this case are smaller than in tools that are only for reaming.

SUMMARY

The underlying object of the invention is therefore to create a drilling tool and a method for producing drill holes, especially in composite materials, that avoid the aforesaid disadvantages. In particular it should be possible to produce in composite materials drill holes that have a continuous constant diameter within narrow tolerances. It should be possible to produce the drill hole in just one work step, and the drilling tool should also have a long service life with very abrasive materials, for instance fiber-reinforced materials like carbon fiber-reinforced plastic; that is, they should be wear-resistant.

This object is attained in that a drilling tool having the features in claim one is created. This drilling tool includes a tip and a shaft arranged opposite the tip as seen in the direction of a longitudinal axis of the drilling tool. The drilling tool has in the area of the tip at least one geometrically defined cutting edge. Provided trailing the tip, as seen in the direction of the longitudinal axis, is an expanded diameter, the tool having a first area that precedes the expanded diameter and that has a first diameter, and a second area that trails the expanded diameter and that has a second diameter. The second diameter is larger than the first diameter. The drilling tool is distinguished in that the expanded diameter and/or the second area is/are embodied such that chips are produced in the area of the expanded diameter and/or in the second area when a workpiece is machined, said chips being consistent with those produced when a workpiece is machined with a geometrically undefined cutting edge. Thus, if a drill hole is added to a workpiece using the drilling tool, there is preferably grinding or honing-like machining in the aforesaid areas. Due to this, especially in tough materials no long chips are produced that could clog the chip spaces in the drilling tool and/or damage the drill hole surface. In addition, the different layers in a composite material are machined in the aforesaid areas in a manner such that their different elasticities and other different properties, especially machining properties, no longer have an effect that would cause different diameters in the drill hole after machining. The drilling tool also has a long service life, even with very abrasive materials like carbon fiber-reinforced plastic.

Preferred is a drilling tool in which the difference between the first and the second diameters is selected such that the chips are produced appropriately. Production of long or large chips is avoided in that the amount by which the second diameter differs from the first diameter is selected such that in the area of the expanded diameter and preferably in the area of the second diameter only small, preferably dust-like particles are removed from the drill hole wall rough-worked with the first diameter. The allowance of the drill hole rough-worked through the area of the first diameter relative to the final dimensions of the completed drill hole is thus so slight that essentially grinding dust-type particles are removed when a workpiece is machined in the area of the expanded diameter and preferably in the second area. Then in at least one of these areas material is removed that is more comparable to that of a grinding or honing process. This material removal cannot clog the chip spaces in the drilling tool nor can it damage the drill hole surface, especially since the material can be carried away with no problem.

Preferred is a drilling tool in which the area of the expanded diameter and the second area do not have a geometrically defined cutting edge. In this case it is not possible for chips to be produced in the area of the expanded diameter and/or in the second area that are consistent with those produced when a workpiece is machined with a geometrically defined cutting edge. Instead, chips are produced as described in the foregoing, preferably occurs in both areas, that are consistent with the chips produced when machining with a geometrically undefined cutting edge.

Also preferred is a drilling tool in which the area of the expanded diameter and preferably also the second area have geometrically undefined cutting edges. In this case it is obvious that when machining a workpiece the chips produced are determined by the geometrically undefined cutting edges.

Also preferred is a drilling tool that has a coating at least in the area of the expanded diameter and in the second area. This may preferably be a diamond coating. The coating is not necessarily provided in the entire area of the second diameter. What is essential is that it includes the area of the expanded diameter and an area adjacent thereto in the direction of the shaft.

Moreover, a drilling tool is preferred in which the coating is provided in a preferably annular area that includes part of the first area, the area of the expanded diameter, and part of the second area. The coating preferably includes a small portion of the first and second areas so that when viewed in the longitudinal direction a comparatively narrow ring is formed. In this manner it is possible to save on coating material, parts of the drill that are essential for machining being coated at the same time. It is particularly preferred for the tip of the drill to remain uncoated.

Particularly preferred is a drilling tool in which the expanded diameter and the second diameter are formed by the coating. A base of the drilling tool is then not coated, or has only a thin coating, in the first area. Consequently the area of the expanded diameter and the second area are then coated, and/or the coating increases in thickness in this area such that the expanded diameter and the second diameter for the tool are formed. If the coating is embodied from coarse grains, for instance coarse diamond grit, the coating in this area removes material in a manner that is comparable to that of a grinding and honing process.

Additional embodiments are found in the subordinate claims.

The object is also attained in that a method for producing drill holes is preferably used for producing drill holes in composite materials. The drilling tool used in the method includes a tip having at least one geometrically defined cutting edge, one shaft, a longitudinal axis, an expanded diameter, a tip-side first area having a first diameter, and a shaft-side second area having a second diameter. For producing the drill hole, tool and workpiece are rotated in a known manner relative to one another about the longitudinal axis of the tool and at the same time are moved axially relative to one another. Typically the drilling tool is rotationally driven and when the drill hole is being produced is displaced axially, that is, in the direction of its longitudinal axis, while the workpiece does not move relative to a fixed coordinate system. However, this is not essential; the sole deciding factor is the relative movement between workpiece and tool. The method is distinguished in that in the area of the expanded diameter and/or the shaft-side area chips are produced when a workpiece is being machined and these chips are consistent with those produced when a workpiece is machined with a geometrically undefined cutting edge. This means that the material removed is comparatively finer and is more consistent with the material removed during a grinding or honing process. The result is the advantages that have already been explained in connection with the drilling tool.

Preferred is a method in which an advance by the drilling tool relative to a workpiece to be machined in the direction of the longitudinal axis when producing a drill hole is selected such that the advance per revolution and per cutting edge of the drilling tool is greater than half the difference between the second diameter and the first diameter. The advance is thus in particular greater than the radial difference between the first area and the second area. The advance is in particular greater than the height of a step that is embodied in the area of the expanded diameter between the first area and the second area. The selection of the advance significantly improves the drilling results, especially with regard to the accuracy and tolerances of drill holes in composite materials. In order to calculate the advance of the drilling tool per revolution and per cutting edge, the axial advance per revolution is divided by the number of primary cutting edges in the area of the tip.

Preferred is a method in which the advance per revolution and cutting edge is greater than the difference between the second diameter and the first diameter. In this case the advance is thus greater than twice the radial jump or twice the step height in the area of the expanded diameter.

Finally, a method is particularly preferred is a method in which a drill hole is produced in one work step. In particular after the drill hole has been produced with the drilling tool no further finishing is necessary, and in particular reaming is no longer necessary. After a single tool stroke, that is, after the tool has moved into and out of the material, the drill hole has a defined diameter, even in different layers of a composite material, and has a narrow tolerance, preferably in the range of IT8 or better according to ISO 286.

BEST DESCRIPTION OF THE DRAWINGS

The invention shall be described in greater details in the following using the figures.

DETAILED DESCRIPTION

Figure 1:
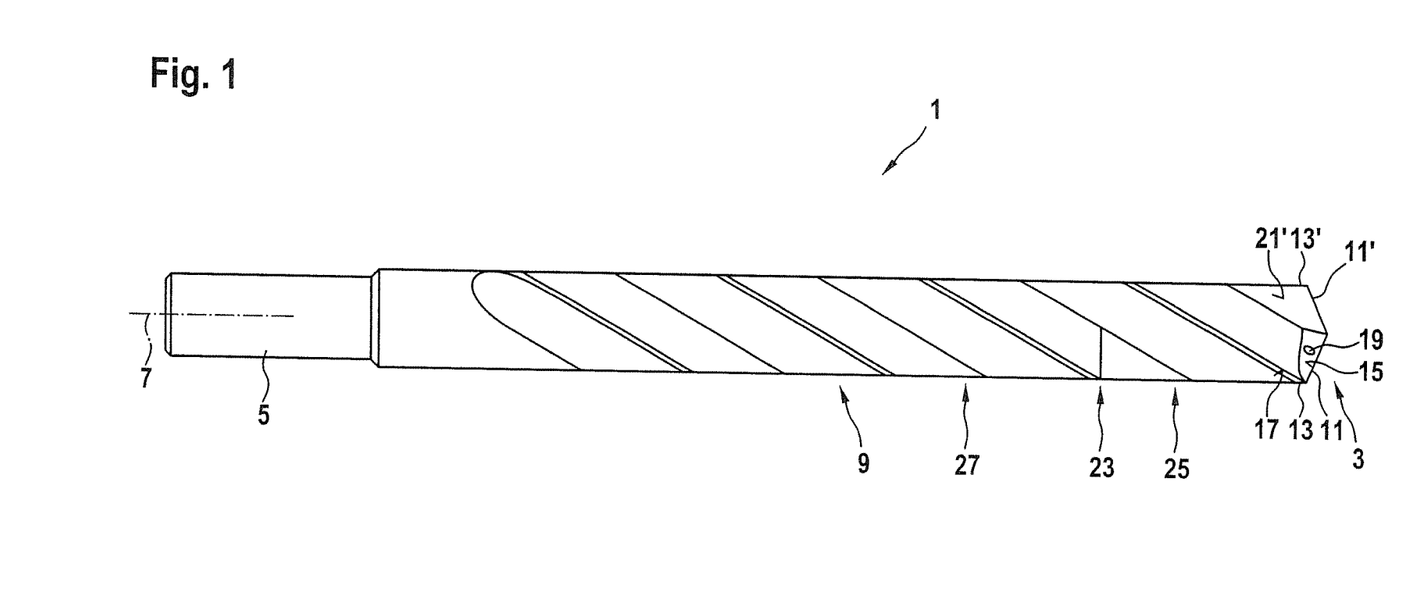
FIG. 1 is a schematic side view of a drilling tool.

FIG. 1 is a schematic side view of a first exemplary embodiment of a drilling tool 1. It includes a tip 3 and a shaft 5 that is on an opposing end and that is preferably used to clamp the drilling tool 1 in a corresponding seat of a machine tool. In order to add a drill hole to a workpiece (not shown), either the workpiece or the drilling tool 1 is rotated about a longitudinal axis 7 of the drilling tool 1. At the same time, the workpiece and the drilling tool 1 are moved relative to one another in the direction of the longitudinal axis 7 so that the machining segment 9 of the drilling tool 1 can penetrate into the workpiece and produce the drill hole there. The workpiece preferably does not move relative to a fixed coordinate system, while the drilling tool 1 is rotationally driven about the longitudinal axis 7. Likewise, the drilling tool 1 is preferably displaced or advanced in the direction of the longitudinal axis 7 so that the machining segment 9 can penetrate into the workpiece. Ultimately, however, it is only the relative movement between the workpiece and the drilling tool 1 that is critical.

In the area of the tip 3, the drilling tool has at least one geometrically defined cutting-edge, preferably at least one primary cutting-edge and one secondary cutting-edge; in the exemplary embodiment depicted it has a first primary cutting-edge 11 with an adjacent secondary cutting-edge 13, as seen in the axial direction, and a second primary cutting-edge 11' with a corresponding secondary cutting-edge 13'. It is possible for only one cutting-edge 11 and one secondary cutting-edge 13 to be provided. In other exemplary embodiments more than two primary cutting edges 11, 11' and more than two secondary cutting edges 13, 13' are provided. In the depicted exemplary embodiment, if the drilling tool 1 is rotationally driven about the longitudinal axis 7, the second primary cutting-edge 11' during one revolution, starting in the position depicted in FIG. 1, leaves the plane of the drawing and moves toward the observer. The first primary cutting-edge 11 simultaneously moves into the plane of the drawing away from the observer.

FIG. 1 depicts a flank 15 that slopes in opposition to the rotational direction of the drilling tool 1 and the lip of which, together with a cutting face (not shown), forms the main cutting edge 11. Also depicted is a secondary flank 17, the cutting edge of which, with the cutting face (not shown), forms the secondary cutting edge 13. In one preferred exemplary embodiment, a circularly ground lands is provided instead of the secondary flank 17, and the circularly ground lands supports the drilling tool 1 in the drill hole.

Preferably provided in the flank 15 is an opening 19 into which opens a coolant/lubricant channel (not shown) that is continuous through the drilling tool 1. Coolant/lubricant may be fed through this channel while a workpiece is being processed, exiting from the opening 19 in order to provide cooling and or lubrication in the region of the tip 3. At the same time, chips that are produced are carried out of the drill hole by the flow of coolant/lubricant in the area of the primary cutting edges 11, 11' and secondary cutting edges 13, 13'. The arrangement of the flank 15, the secondary flank 17, and the opening 19 explained for the primary cutting edge 11 and the secondary cutting edge 13 is preferably provided in exactly the same manner in the area of the primary cutting edge 11' and the secondary cutting edge 13', as well. Therefore no separate explanation shall be provided for this.

Also depicted in FIG. 1 is another cutting face 21', the lip of which, with a flank (not shown), forms the second primary cutting edge 11'. In addition, a lip of the cutting face 21', with a secondary flank (also not shown), forms the secondary cutting edge 13'. A similar cutting face is also provided in the area of the primary cutting edge 11 and the secondary cutting edge 13, the latter not being shown in FIG. 1.

Different geometries, especially different cutting edge geometries, may be provided for the drilling tool 1 in the area of the tip 3. In particular one skilled in the art is familiar with special geometries that are particularly suitable for machining composite materials. With nothing further, one skilled in the art will select a known, suitable geometry, and for this reason this will not be discussed in greater detail. What is essential, however, is that provided in the area of the tip 3 is at least one sharply ground, geometrically defined cutting edge, especially one sharply ground primary cutting edge and one sharply ground secondary cutting edge.

The drilling tool 1 has an expanded diameter 23 trailing the tip 3 in the direction of the longitudinal axis 7, especially in the feed direction. A first area 25 having a first diameter is provided from the tip 3 to the expanded diameter 23 as seen in the longitudinal direction. The expanded diameter 23 may be embodied as a diameter jump or as a continuous expansion in diameter that extends across a certain area of the axial length of the drilling tool 1. This shall be explained in greater detail in the following. In any case, the expanded diameter includes an end facing the shaft 5, at which end the diameter of the drilling tool 1 does not become any larger. From this end, as seen in the longitudinal direction, a second area 27 having a second diameter extends towards the shaft 5. In one exemplary embodiment this second area may continue to the shaft 5. However, it is preferably also possible for the area 27, as seen from the expanded diameter 23, to extend over only a certain area of the longitudinal extension of the drilling tool 1 to the shaft 5, wherein the drilling tool 1 may then in the remaining area to the shaft 5 have a different diameter, for instance an even smaller diameter or possibly an even larger diameter.

The second diameter in the second area 27 is larger than the first diameter in the first area 25.

The expanded diameter 23 and/or the second area 27 is/are embodied such that chips produced when the workpiece is machined are consistent with those produced when a workpiece is machined with a geometrically undefined cutting edge.

The second diameter is preferably at most larger than the first diameter by an amount such that no long or large chips may be produced in the second area 27 or in the area of the expanded diameter 23. Thus if the drilling tool 1 moves into a workpiece along the longitudinal axis 7, first a drill hole is produced in the first area 25, which drill hole has an allowance with respect to the drill hole to be finished. The material that corresponds to the allowance is then removed in the area of the expanded diameter 23 or in the second area 27 when the drilling tool 1 moves further into the workpiece. The difference between the first and second diameters is selected such that, due to the small allowance, preferably dust-like particles are removed so that the machining there is more comparable to a grinding or honing process. The expanded diameter 23 and the adjacent area 17, as seen in the axial direction, may therefore also be characterized as a grinding step. The second diameter is preferably between 0 µm and approximately 60 µm larger than the first diameter, particularly preferably between approximately 10 µm to 50 µm larger than the first diameter, very particularly preferably about approximately 30 µm larger than the first diameter. Also particularly preferred is an exemplary embodiment in which a step height for the expanded diameter 23, that is, virtually a radial jump between the area 25 and the area 27, is a maximum of 15 µm. Thus the machining depth in the area of the expanded diameter 23 or the area 27 is approximately 10 times smaller than conventional cutting depths when reaming.

It is particularly preferred that, depending on a composite material to be machined, the value by which the second diameter exceeds the first diameter is selected such that it is approximately equal to a value for the largest diameter deviation in the material layers of the composite material that occurs when adding a drill hole to the composite material with a drilling tool that does not have an expanded diameter. With a given composite material to be processed, therefore, one skilled in the art first determines what the maximum diameter deviation in the material layers is when the material is machined with a conventional drilling tool that does not have an expanded diameter. For machining this material, one skilled in the art then selects a drilling tool 1 in which the difference between the second diameter and the first diameter is approximately equal to the value found for the largest diameter deviation. The drilling tool 1 may thus preferably be matched to a specific composite material or to a specific size of the diameter deviation in the material layers. Consequently it is possible to provide different drilling tools 1 for different composite materials.

Figure 2:
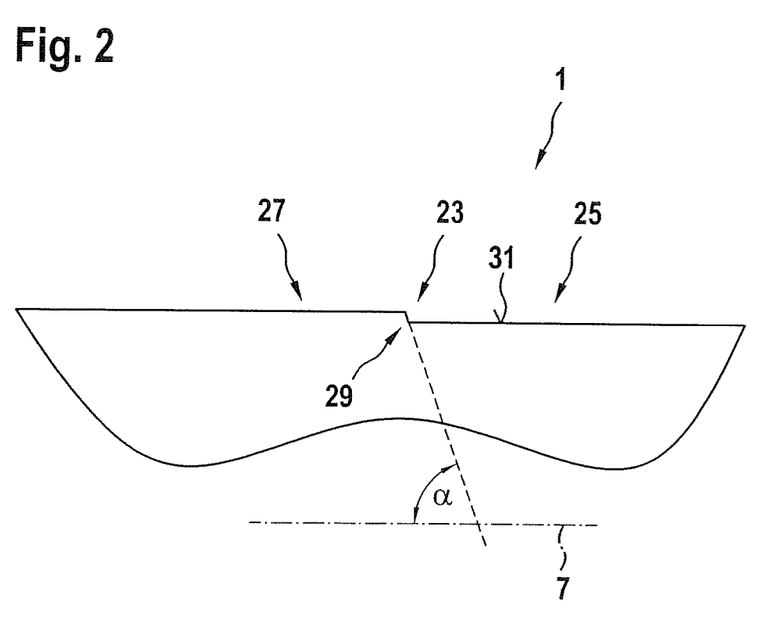
FIG. 2 is a much enlarged detail of the drilling tool in FIG. 1 in the area of an expanded diameter.

FIG. 2 is a much enlarged detail of the drilling tool 1 in FIG. 1. Identical and functionally identical elements are identified with the same reference numbers; refer to the description in the foregoing. As seen in the axial direction, the expanded diameter 23 preferably extends across an expanded area 29. This means that it is not embodied as an abrupt, radial step, but rather has a certain extension along the longitudinal axis 7. In the expanded area 29 the diameter of the drilling tool 1 preferably increases continuously from the tip 3 to the shaft 5. In the expanded area 29 a circumferential surface 31 of the drilling tool 1, with the longitudinal axis 7, preferably creates an acute angle α. The latter is between approximately 60° to approximately 80°, particularly preferred approximately 70°. It has been found that when a workpiece is being machined the forces introduced into the area of the expanded diameter 23 are lower if the angle α is more acute, that is, if it is smaller. In particular, if the expanded diameter 23 is embodied as a radial diameter jump, that is, the circumferential surface 31 in this area, with the longitudinal axis 7, creates an angle of approximately 90°, this creates a heavily loaded corner that is subject to heavy wear. A more acute or smaller angle α may therefore contribute to reducing wear in this area. This achieves a longer service life for the drilling tool 1. In particular, if the drilling tool 1 is coated in the area of the expanded diameter 23, it is possible to reduce removal of the coating using a smaller angle α and thus to reduce wear.

As seen in the axial direction, the expanded area 29 preferably extends across a length of 0 to approximately 10 mm, particularly preferably across a length of approximately 3 mm to approximately 7 mm, very particularly preferably across a length of approximately 5 mm. Thus, in this last, very particularly preferred case, if the expanded diameter 23 includes a step height or an expanded radius of 15 μm, the radius of the drilling tool 1 increases by 3 μm per millimeter in the expanded area 29.

Figure 3:
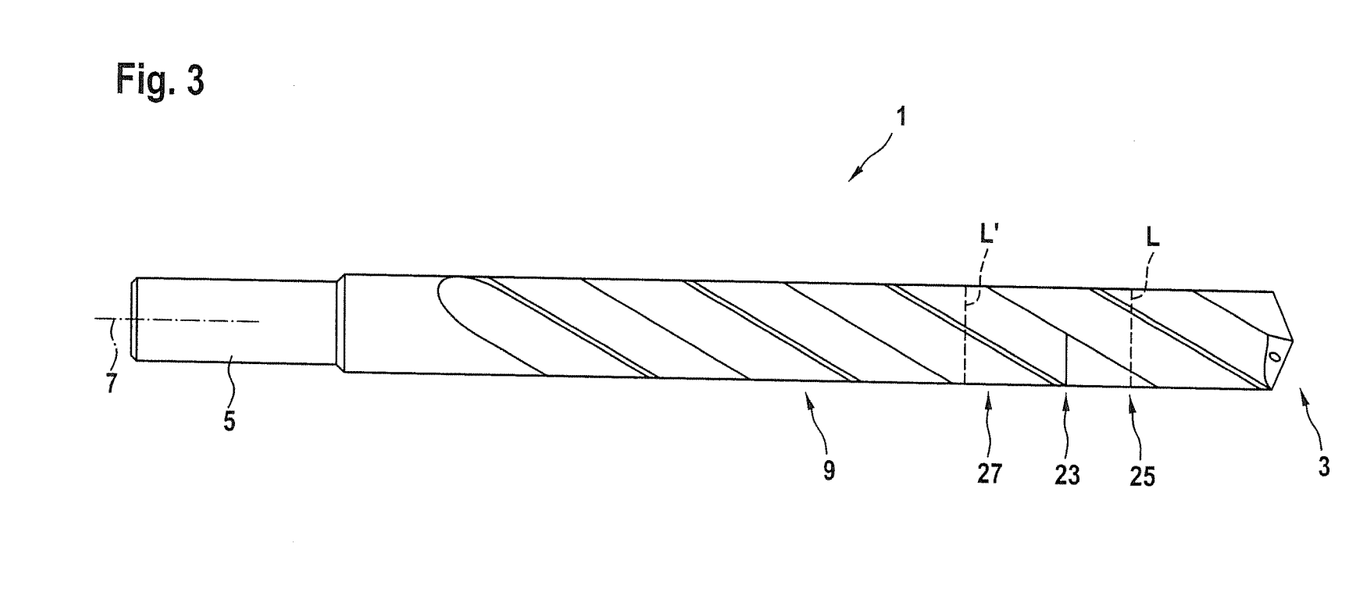
FIG. 3 is a schematic side view of a second exemplary embodiment of a drilling tool; and, FIG. 4 is a schematic sectional view of a third exemplary embodiment of a drilling tool in the area of a second diameter.

FIG. 3 is a side view of a second exemplary embodiment of a drilling tool 1. Identical and functionally identical elements are identified with the same reference numbers; refer to the description in the foregoing. In the exemplary embodiment in FIG. 3, the drilling tool 1 has a coating, in at least in some parts of at least the area of the expanded diameter 23 and preferably also the second area 27. In the exemplary embodiment depicted, as seen from the tip 3, the coating extends towards the shaft 5 from a first broken line L to a second broken line L'. The lines L, L' are notional lines that are intended to indicate the extent of the coating.

In another exemplary embodiment it is possible to coat the drilling tool 1 at least in the entire machining segment 9, including the tip 3. However, it this case it must be assured that the coating in the area of the tip 3 is thin, finely granulated—if granulated at all—and relatively smooth so that the cutting edges in this area are sharp and there is no build-up on the cutting edge. In addition, efficient chip removal must be assured.

It is preferred that the area of the tip 3 not be coated so that it always remains sharp.

The coating preferably includes a diamond coating or is embodied as a diamond coating. It is particularly preferred that the coating is embodied as coarse grains at least in the area of the expanded diameter 23, preferably also in the area 27. In particular it is also possible for the coating in this area to have coarse diamond grit so that at the expanded diameter 23 and in the area 27 there is particularly efficient material removal that is essentially consistent with the material removal in a grinding or honing process. The grit in the diamond coating preferably provides geometrically undefined cutting edges.

The coating may also preferably be embodied as a wear-resistant coating, in particular in the area of the expanded diameter 23, but also in the area 27.

The coating may extend as far as desired from the expanded diameter 23 towards the shaft 5 as seen in the axial direction. In particular the coating does not have to terminate at the line L' as shown in FIG. 3. On the other hand, a coating in the area that is delimited by the lines L, L' is adequate and saves material and therefore costs. For particular cost savings, it may be provided that the coating is provided virtually only in the area of the expanded diameter 23 or a few millimeters axially before the expanded diameter 23 begins and preferably terminates a few millimeters beyond it. What is essential is that due to the preferably coarse grain coating preferably a grinding stage with geometrically undefined cutting edges is formed in the area of the expanded diameter 23.

In particular, it is preferred that the coating is provided in a preferably annular area that includes part of the first area 25, the area of the expanded diameter 23, and a part of the second area 27. As seen in the axial direction, the annular coating preferably extends both into the first area and into the second area for only a short distance, particularly preferred for only a few millimeters. In another exemplary embodiment, however, it is also possible for the coating to extend across a longer distance, at least in the second area 27, preferably across the entire second area 27.

The drilling tool 1 is preferably not coated in the area of the tip 3 so that it is embodied sharp. In another exemplary embodiment, however, it is possible for the drilling tool 1 to have a coating in the area of the tip 3. However, it is preferably embodied differently than the coating in the area of the expanded diameter and particularly preferred is embodied smooth. In particular it is possible to embody the coating thin in the area of the tip 3. This ensures that the at least one geometrically defined cutting edge in the area of the tip 3 is always sharp. What is essential is that the coating in the area of the tip 3 is much smoother than the coating in the area of the expanded diameter 23.

The expanded diameter 23 and the second diameter are preferably formed by the coating. The latter is thus applied in a manner such that its thickness increases in the area of the expanded diameter 23 and ultimately provides the second diameter in the area 27. In particular the diameter of a base of the drilling tool 1, on which base the coating is applied, may be constant along the longitudinal axis 7. If the coating is then embodied with a coarse grain in the area of the expanded diameter 23 and preferably also in the second area 27, or if it is coarse diamond grit, the material removal provided there is consistent with that of a grinding or honing process, that is, ultimately, it is consistent with machining with a geometrically undefined cutting edge.

It is possible for the base of the drilling tool 1 to have a cylindrical geometry from the area of the expanded diameter 23 to the shaft 5. In contrast to the exemplary embodiments illustrated, in this case there are no grooves provided in the base. Ultimately they are not absolutely necessary in the area of the expanded diameter 23 and in the second area 27 for the more grinding or honing-like machining of a workpiece. However, they do make it easier to remove material particles from the drill hole.

In addition, for one skilled in the art it is obvious that it does not matter whether the grooves are helical, as in the exemplary embodiments in accordance with FIGS. 1 through 4, or extend in a straight line along the longitudinal axis 7. Exemplary embodiments are possible with both geometries.

Figure 4:
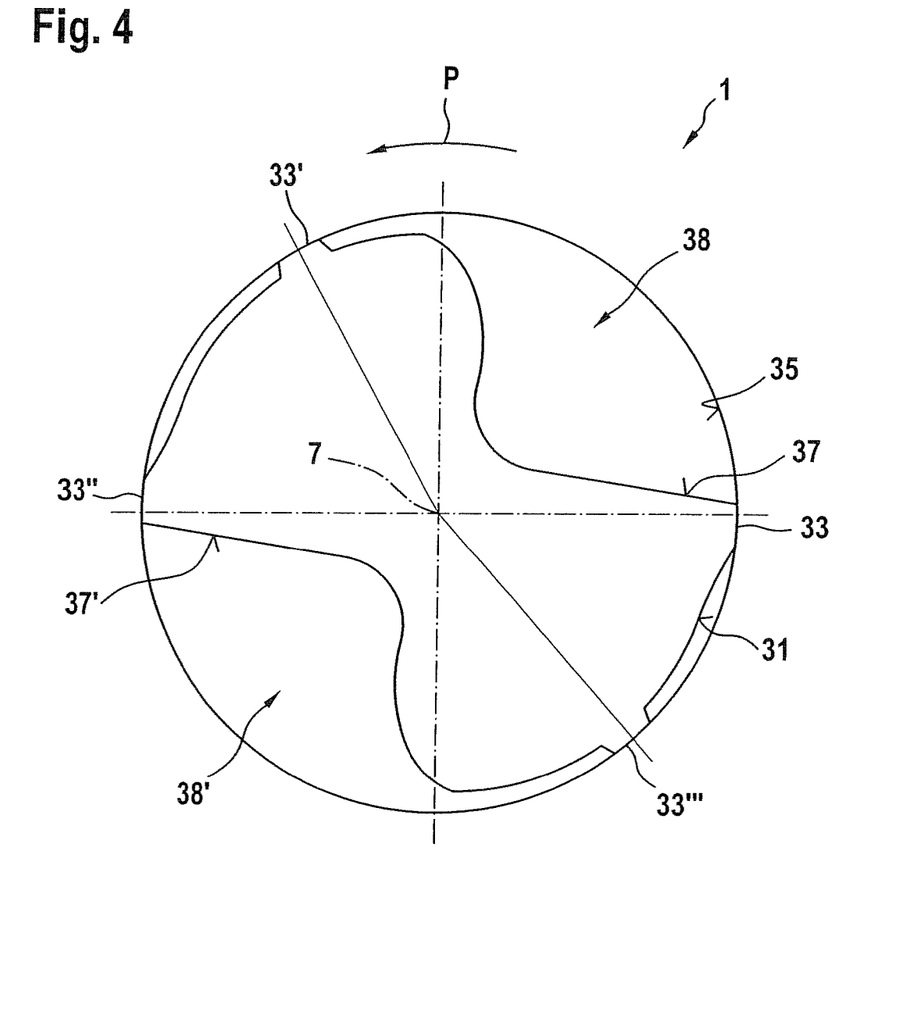

FIG. 4 depicts a sectional view through a third exemplary embodiment of a drilling tool 1, the cutting plane being arranged trailing the expanded diameter 23 in the area 27, as seen from the tip 3 in the direction of the longitudinal axis 7. Identical and functionally identical elements are identified with the same reference numbers; refer to the description in the foregoing. Provided in the area of the cutting plane are at least two grinding studs; in the exemplary embodiment depicted in FIG. 4 four grinding studs 33, 33', 33" and 33''' are provided. Grinding studs 33, 33" are formed by surfaces that virtually correspond to the adjacent flanks in the area of the tip 3, two primary cutting edges and two secondary cutting edges being provided at the tip 3 in the exemplary embodiment according to FIG. 4. In contrast to the tip geometry, where sharp, geometrically defined secondary cutting edges are provided, however, the grinding studs 33, 33' remove material from a drill hole wall 35 using virtually their entire surface. Consequently, no geometrically defined cutting edges are provided in the area of the expanded diameter 23 and in the second area 27. In particular the grinding studs 33, 33', 33", 33''' do not include any geometrically defined cutting edges. They preferably include geometrically undefined cutting edges, for instance, a coarse grain coating.

However, an exemplary embodiment is possible in which at least one geometrically defined cutting edge is also provided in the area of the expanded diameter 23 and/or in the area 27. In this case, as well, however, chips are produced in the aforesaid areas that are consistent with those produced during machining with a geometrically undefined cutting edge because the first diameter and the second diameter differ by only a correspondingly slight amount. However, geometrically undefined cutting edges are preferably provided in the aforesaid areas so that chips are produced in this manner for this reason alone. Material is preferably removed using a preferred coarse grain coating.

One exemplary embodiment is preferred in which at least one geometrically defined cutting edge is provided in the area of the tip 3 and in the area of the expanded diameter, and no geometrically defined cutting edge is provided in the second area, but rather geometrically undefined cutting edges are provided. At the same time, the difference between the first diameter and the second diameter is preferably selected to be much smaller than it is for the normal machining depth, for instance when reaming. The step height for the expanded diameter 23, that is, the virtual radius jump between the first area 25 and the second area 27, preferably includes a value from the ranges of values provided in the foregoing.

FIG. 4 depicts surfaces 37, 37' that correspond to the cutting face 21' depicted in FIG. 1 and the cutting face associated with the primary cutting edge 11 (not shown in FIG. 1). Also depicted here are grooves 38, 38' that continue to the tip 3 in the chip grooves of the drilling tool 1. In the area shown in the figure, the grooves 38, 38' are not called chip grooves, however, because no chip removing-machining takes place here. Essentially dust-like particles removed from the drill hole wall 35 may collect in the grooves 38, 38' just as well and be carried out of the bore hole through them or rinsed out where necessary using coolant/lubricant that flows from the tip 3 through the grooves 38, 38'.

As has already been explained, the issue is not whether the chip grooves or grooves 38, 38' are provided on the drilling tool 1 in a helix or whether they extend in a straight line in the direction of the longitudinal axis 7. Exemplary embodiments with both geometries are possible, the exemplary embodiments depicted in FIGS. 1 through 4 including only the helical chip grooves or grooves 38, 38'.

The rotational direction of the drilling tool 1 when machining a workpiece is shown in FIG. 4 using the arrow P.

Against the rotational direction and as seen in the radial direction, the circumferential surface 31 jumps back starting from the grinding studs 33, 33". As seen in the circumferential direction against the rotational direction, grinding studs 33', 33''' are embodied trailing the grinding studs 33, 33" and in the area of the former the circumferential surface 31, as seen from the radial direction, also jumps, so that material from the drill hole wall 35 is removed here. Again, as seen in the circumferential direction, trailing the grinding studs 33', 33''' the circumferential surface 31 jumps back, as seen in the radial direction, until it finally transitions into the grooves 38, 38'. However, the grinding studs 33', 33''' may also continue across the expanded diameter 23 to the tip 3 and be embodied in the first area 25 or in the area of the tip 3 as supports. Naturally in this area no material is removed through the supports, which are used only for centering and guiding the drilling tool 1.

The grinding studs 33, 33', 33", 33''' have an unequal angular distance as seen in the circumferential direction. This can especially prevent the drilling tool 1 from chattering. Even in exemplary embodiments in which the drilling tool 1 has only two grinding studs 33, 33", the latter are preferably not diametrically opposite one another. It is clearly evident in FIG. 4 that in any case the grinding studs 33' and 33''' are not diametrically opposite one another. In particular the grinding stud 33''' has a smaller angular distance to the grinding stud 33 than the grinding stud 33' has to the grinding stud 33". Preferred is an unequal angular distribution in which at least a second grinding stud trails a first grinding stud by an angle that is different from the angle by which the third grinding stud trails the second grinding stud. Expressed another way, in a drilling tool 1 that has at least three grinding studs, at least one grinding stud is offset from its symmetrical position, as seen in the circumferential direction, such that there is no longer any symmetrical or equal angle distribution. The same applies to a drilling tool 1 having four or more grinding studs. It is very particularly preferred that all angles between two grinding studs are different.

One preferred exemplary embodiment of a drilling tool 1 includes three grinding studs, one grinding stud trailing another grinding stud, as seen in the circumferential direction, by approximately 30° to approximately 50°, preferably by approximately 35° to approximately 45°, especially preferably by approximately 40°. Such a drilling tool 1 has proved not to be very susceptible to chattering at all. Finally, in this manner it is possible to increase the surface quality of the drill hole produced with the drilling tool 1.

The exemplary embodiments of the drilling tool 1 described in the foregoing are preferably embodied integrally. Another embodiment of a drilling tool 1 may be embodied in a plurality of parts, especially in two parts. In this case the first area 25 is preferably embodied as a drill while the second area 27 and the area of the expanded diameter 23 are embodied as a grinding tool, preferably as a type of grindstone. The combined drilling tool 1 may preferably be joined together using interfaces from both parts of the tool, the interfaces being known per se. Finally, multi-part drilling tools are also possible. For instance, at least one cutting attachment on which the at least one geometrically defined cutting edge is arranged may be provided in the area of the tip 3.

The method for producing drill holes shall be described in greater detail in the following. The method is preferably executed using a drilling tool in accordance with the explanations in the foregoing. In any case, the drilling tool 1 includes a tip 3 having at least one cutting edge, a shaft 5, a longitudinal axis 7, an expanded diameter 23, and a tip-side area 25 having a first diameter and a shaft-side area 27 having a second diameter. When a workpiece is being machined, chips form in the area of the expanded diameter 23 and/or in the shaft-side area 27, the chips being consistent with those formed during machining of a workpiece with a geometrically undefined cutting edge.

The axial advance of the drilling tool 1 per revolution and cutting edge with respect to a workpiece to be machined is selected such that it is greater than half the difference between the second and the first diameter. The advance is thus greater than the radial difference between the area 27 and the area 25.

It is particularly preferred that the advance per revolution and per cutting edge is greater than the difference in diameter between the area 27 and the area 25.

The surface quality of the drill hole and the accuracy of the diameter along different layers of a machined composite material and the tolerances for the drill hole may be improved by appropriately selecting the advance.

It is very particularly preferred that the drill hole is finished in one work step. To produce the drill hole, the drilling tool 1 thus moves into and out of the workpiece one time. The drill hole then has the desired tolerances and thus a precisely defined diameter, even in the different layers of a composite material. There are therefore no further machining steps, and there is in particular no subsequent reaming. It is particularly preferably possible to produce a drill hole that has a tolerance in the range of IT8 according to ISO 286 or better in one work step, that is, during one work stroke of the tool.

The method is preferably executed with a drilling tool 1 according to the explanations in the foregoing, especially the exemplary embodiments in accordance with FIGS. 1 through 4. In this case, machining takes place in the area of the expanded diameter 23 or in the area 27, and this machining is consistent with that with a geometrically undefined cutting edge. Material is removed that is more consistent with that removed in a grinding or honing process.

When producing a drill hole with the drilling tool 1 or using the method, different physical parameters or machining properties for different layers in a composite material may not have the same negative effect on the tolerances of the drill hole as when conventional tools are used because, for finishing to the final dimensions of the drill hole, the material is not removed as it is for machining with a geometrically defined cutting edge; on the contrary, it is removed in the manner of a grinding or honing process. Thus it is possible in a single work step to produce a drill hole that has even more precise diameter tolerances than a drill hole that is first pre-bored with conventional tools and then finish-reamed in a second work step. Due to the grinding or honing-like removal of material in the area of the drilling tool 1 that machines the drill hole to its final dimensions, it is not possible for long chips of tough material to be created that clog the chip spaces of the drilling tool 1 and/or damage the drill hole surface. Due to the dust or the chips, which at most are very small, that are produced when the drill hole is machined to its final dimensions, the tool has a long service life and suffers minor wear even in very abrasive fiber-reinforced materials such as for instance carbon fiber-reinforced plastics.

The invention claimed is:

1. A drilling tool for producing drill holes in a workpiece, the drilling tool comprising:
   a tip;
   a shaft arranged opposite the tip in a direction of a longitudinal axis of the drilling tool;
   a first area preceding an expanded diameter and having a first diameter, the first area including a first cutting portion in the form of a primary cutting edge configured to remove chips from the workpiece;
   a second area trailing the first area and having a second diameter, the second diameter being larger than the first diameter, the second area having at least one second cutting portion configured to remove fine material in the form of dust-like particles from the workpiece; and
   at least one groove for collecting the dust-like particles, wherein the first area further includes a secondary cutting edge.

2. The drilling tool in accordance with claim 1, wherein the at least one groove includes a pair of grooves.

3. The drilling tool in accordance with claim 1, wherein the at least one groove is a helical groove.

4. The drilling tool in accordance with claim 1, wherein the at least one groove extends to the tip.

5. The drilling tool in accordance with claim 1, further comprising a coating at least at the expanded diameter.

6. The drilling tool in accordance with claim 5, wherein the coating comprises a coarse grain at least in the area of the expanded diameter.

7. A method of producing a drill hole in a workpiece with a drilling tool having a tip, a shaft arranged opposite the tip, and an expanded diameter axially between the tip and the shaft, the method comprising:
   removing chips from the workpiece with a primary cutting edge of a first cutting area that precedes the expanded diameter and has a first diameter; and
   removing dust-like particles from the workpiece with a second cutting area that trails the first cutting area, the second cutting area having a second diameter greater than the first diameter and being absent of sharp cutting edges;
   wherein the dust-like particles removed by the second area are comparatively finer than the chips removed by the first area, and
   wherein the first area further includes a secondary cutting edge.

8. The method of producing a drill hole in accordance with claim 7, wherein the second diameter being no greater than 60 µm compared to the first diameter.

9. The method of producing a drill hole in accordance with claim 7, further comprising collecting the dust-like particles in at least one groove that extends to the tip.

10. The method of producing a drill hole in accordance with claim 7, further comprising collecting dust-like particles in a pair of grooves extending to the tip.

11. The method of producing a drill hole in accordance with claim 7, further comprising collecting the dust-like particles in a pair of helical grooves extending to the tip.

12. The drilling tool in accordance with claim 1, further comprising a primary flank sloping in opposition to a rotational direction of the drilling tool, the primary flank having a lip cooperating with a primary cutting face to define the primary cutting edge.

13. The drilling tool in accordance with claim 12, further comprising a secondary flank having a lip cooperating with a secondary cutting face to define the secondary cutting edge.

14. The method of producing a drill hole in accordance with claim 7, further comprising a primary flank sloping in opposition to a rotational direction of the drilling tool, the primary flank having a lip cooperating with a primary cutting face to define the primary cutting edge.

15. The method of producing a drill hole in accordance with claim 14, further comprising a secondary flank having a lip cooperating with a secondary cutting face to define the secondary cutting edge.

* * * * *